United States Patent [19]

Samaniego

[11] Patent Number: 5,062,760

[45] Date of Patent: Nov. 5, 1991

[54] MATERIAL HANDLING SYSTEM

[75] Inventor: Felix Samaniego, Roswell

[73] Assignee: Transport Technology Corporation, Roswell, N. Mex.

[21] Appl. No.: 510,133

[22] Filed: Apr. 16, 1990

[51] Int. Cl.$^5$ ............................................. B60P 1/54
[52] U.S. Cl. .................................. 414/542; 187/9 R; 212/267; 414/460
[58] Field of Search ............... 414/460, 461, 539, 540, 414/541, 542, 543, 544, 560, 561; 187/9 R, 9 E; 212/267

[56] References Cited

U.S. PATENT DOCUMENTS

| | | |
|---|---|---|
| 2,546,362 | 3/1951 | Graham . |
| 2,758,730 | 8/1956 | Tapp et al. . |
| 2,765,928 | 10/1956 | Riemenschneider ............... 212/135 |
| 2,778,512 | 1/1957 | Strona . |
| 2,996,201 | 8/1961 | Neher . |
| 3,006,483 | 10/1961 | Martin ................................ 414/542 |
| 3,006,486 | 10/1961 | Cook et al. . |
| 3,116,586 | 1/1964 | Ingham, Jr. ............................. 57/52 |
| 3,176,861 | 4/1965 | Paul et al. . |
| 3,396,601 | 4/1968 | Wright ............................ 212/267 X |
| 3,482,715 | 12/1969 | Worthington . |
| 3,482,716 | 12/1969 | Leadley . |
| 3,572,513 | 3/1971 | Tantlinger et al. ............. 414/542 X |
| 3,691,943 | 9/1972 | Boyd ................................... 100/215 |
| 3,786,936 | 1/1974 | Staadt . |
| 4,194,867 | 3/1980 | Bragg ................................. 414/542 |
| 4,297,071 | 10/1981 | Dunbar .............................. 414/542 |
| 4,425,071 | 1/1984 | Dunbar .............................. 414/542 |
| 4,642,018 | 2/1987 | Leroux et al. ...................... 414/502 |
| 4,659,276 | 4/1987 | Billett ................................. 414/543 |
| 4,671,730 | 6/1987 | Gateau ........................... 414/541 X |
| 4,810,160 | 3/1989 | Emiliani et al. ..................... 414/543 |

FOREIGN PATENT DOCUMENTS

| | | | |
|---|---|---|---|
| 2422692 | 11/1975 | Fed. Rep. of Germany ...... 414/542 |
| 2440182 | 3/1976 | Fed. Rep. of Germany ...... 414/542 |
| 2723012 | 11/1978 | Fed. Rep. of Germany . |
| 270258 | 11/1988 | Japan ................................. 414/542 |
| 2105294 | 3/1983 | United Kingdom ................ 414/542 |

Primary Examiner—Frank E. Werner
Attorney, Agent, or Firm—Bernard L. Howard; Richard G. Harrer

[57] ABSTRACT

A three axis material handling system which is particularly adapted to load or unload cargo into or out of the cargo compartment of an enclosed van or trailer. The system is mounted adjacent to the roof of the cargo compartment and includes a so-called X-axis frame which traverses the length of the compartment, a series of Y-axis frames which traverse the width of the compartment, a lifting means which traverses the vertical axis of the compartment and which is mounted to the X-axis frame, and drive means for moving the X-axis frame throughout the X and Y axes of the compartment. The X-axis frame is suspended from the Y-axis frames by a carriage assembly which allows the X-axis frame to move throughout the X-axis and Y-axis of the compartment.

7 Claims, 3 Drawing Sheets

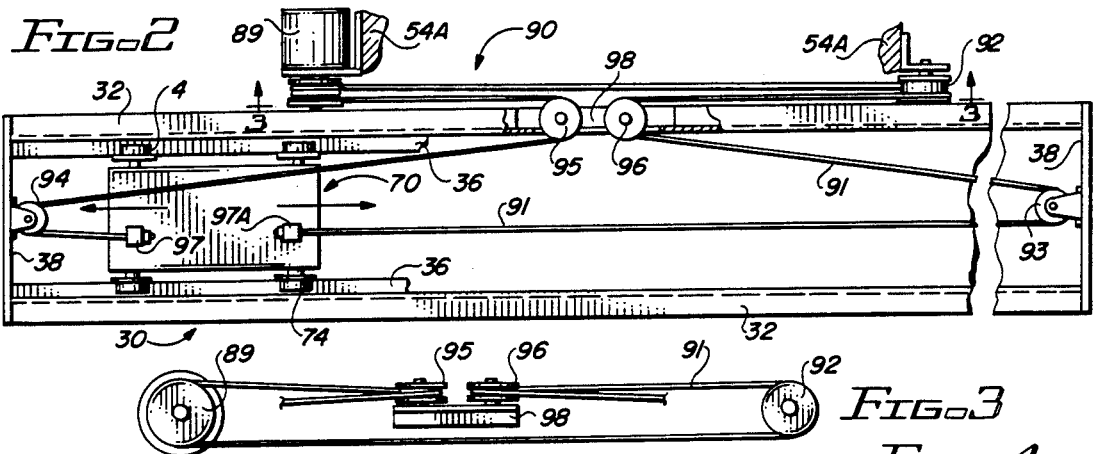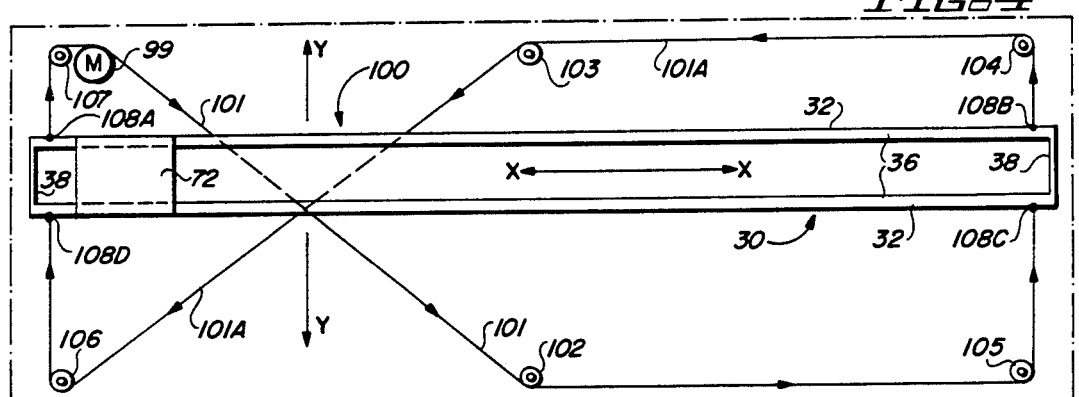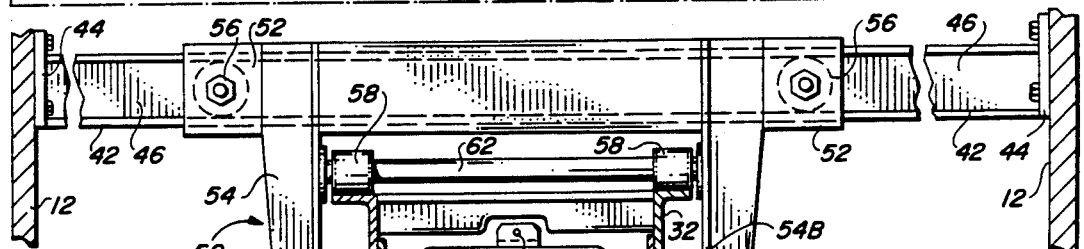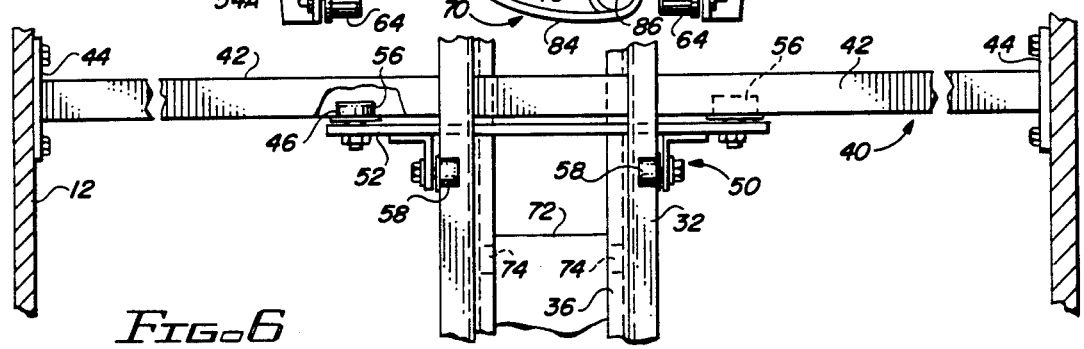

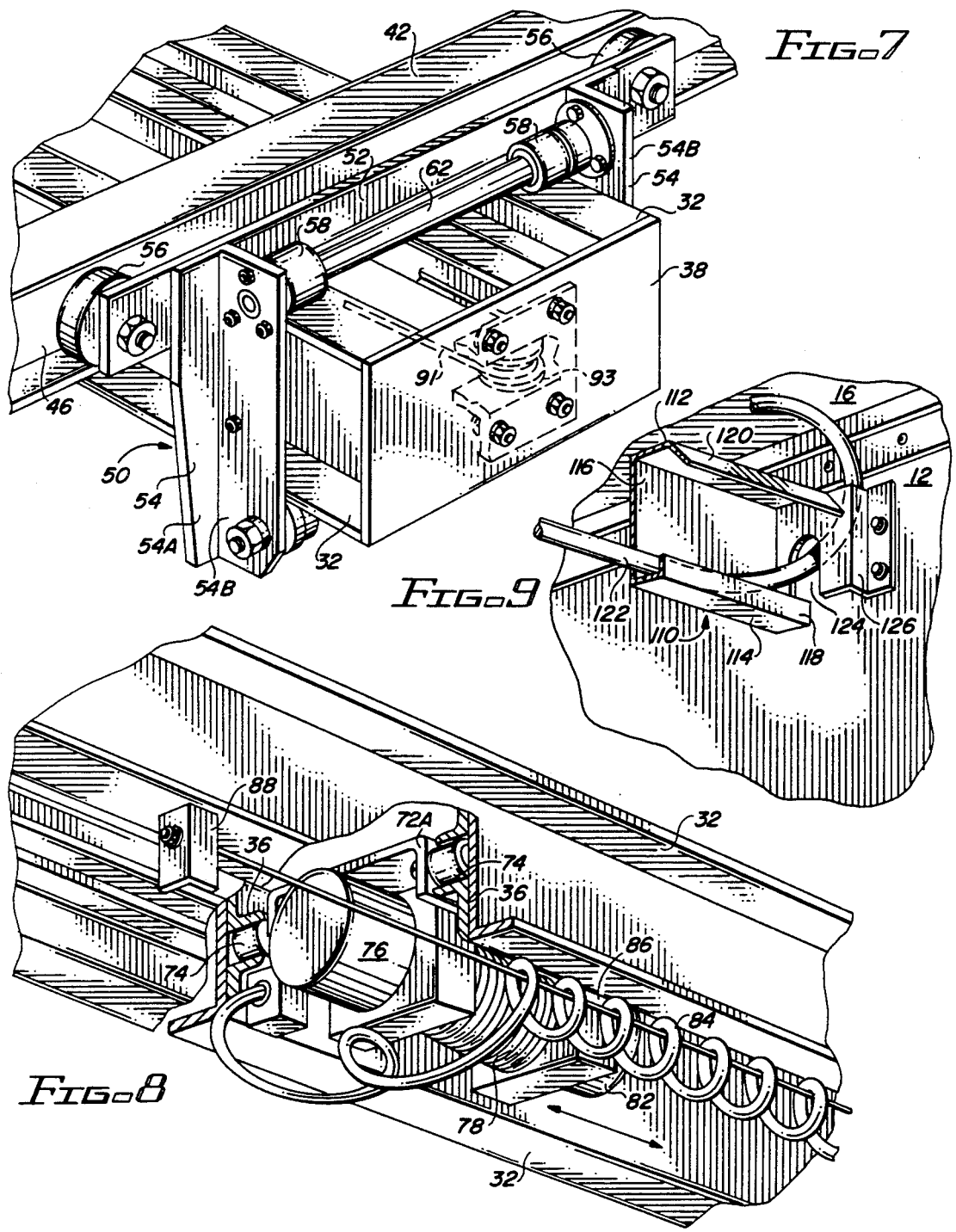

MATERIAL HANDLING SYSTEM

This invention relates to a material handling system for transporting cargo of various types from one place to another and more particularly to a material handling system particularly adapted to load and unload cargo into or out of a van or trailer. The assembly includes specialized means for picking up cargo from outside the trailer and positioning it at virtually any place within the trailer. Conversely, such cargo may be picked up from any point within the trailer and placed outside the trailer.

BACKGROUND OF THE INVENTION

It is rather common to see cargo delivery vehicles equipped with apparatus to aid the driver in placing heavy loads either into or removing it from the truck. One such apparatus is called a "lift gate" which is mounted at the rear end of the truck,s cargo compartment and can be lowered to ground level. The driver moves the load onto the horizontal surface of the lift gate and then operates the gate so as to bring the load up to the level of the bed of the truck. Although such an apparatus is an aid to the driver in that he does not have to lift the heavy load from ground level up to the bed of the truck, or from the truck to the ground, a serious disadvantage is that the driver must still move the load onto the lift gate and then properly position the load within the truck. Another type of apparatus is a swing style crank mounted on a post located usually in the center of the truck bed. Such a crank or crane is commonly used with trucks that carry construction materials. Disadvantages of such an apparatus is that the post eliminates storage space and of course obstructs the positioning of materials on the truck bed. Many of such installations require that the truck not have side walls in the cargo compartment to allow the crane to swing around the perimeter of the truck bed. This of course leaves materials that are to be transported exposed to weather, theft and the like.

Another type of cargo transfer device is a hoist which rides upon rails affixed to the side walls of a trailer. A pair of extension swing booms are pivotally fixed to the rearward end of the rear cargo compartment in such a manner that they can be swung to extend the rail lengths to the exterior of the truck. The extended rail lengths then allow the hoist to move to the exterior of the rearward portion of the rear cargo compartment. Certainly a disadvantage with this type of device relates to the swing boom and the fixation at the rear of the truck. The swing booms, when not in operation, need to be folded across the rear of the truck and, if the rear of the cargo compartment has doors, be folded to a position within the cargo compartment. This eliminates potential cargo space.

Other types of cargo transporting devices have been proposed, but virtually all of them do not have the ability to position a load at virtually any point within the cargo carrying compartment, nor the ability to pick up the cargo from within the compartment at virtually any point and place it on the ground outside of the trailer.

SUMMARY OF THE INVENTINO

The material handling system of this invention is particularly suitable for loading and unloading cargo into and from the cargo compartment of a vehicle such as an enclosed van or trailer. The system is mounted in the interior of the cargo compartment adjacent its roof and allows for positioning a load at any point within the cargo compartment and for a distance beyond the exterior of the cargo compartment. The system includes a lifting means which is operable throughout the total "X" axis of the vehicle,s cargo compartment, that is it traverses the entire length of the compartment; and throughout the so-called "Y" axis of the compartment, that is it traverses the width of the compartment. Vertical movement of the lifting means along a so-called "Z" axis is provided in a specific embodiment by a winch and cable assembly. Thus, the system may be generally described as one which not only includes means for moving cargo in the X, Y and Z directions inside the cargo compartment, but also includes means for extending a portion of the system a distance outside an end of the cargo compartment for picking up or unloading cargo, and the lifting means also operates in the X, Y and Z axes outside the compartment. The system's appropriate lifting means, such as a motor driven winch, is mounted to an X-axis frame, that is a frame that runs substantially the length of the cargo compartment, and are so mounted to the frame that they will move along virtually the entire length of the frame. The X-axis frame is in turn suspended from two or more spaced apart Y-axis frames which are positioned above the X-axis frame, and which extend between the sides of the cargo compartment. The mounting of the X-axis frame to the Y-axis frame is such that the entire X-axis frame will move substantially the entire distance of the Y-axis of the compartment, that is, from one side of the compartment to the other. Thus, the lifting means will move in both an X-axis and Y-axis direction within the cargo compartment. Moreover, the system is so designed that movement of the lifting means along the X-axis frame from the front of the cargo compartment to the rear of the cargo compartment will cause the X-axis frame to move a distance out the rear end of the compartment. This allows the lifting means to also extend or move outside the cargo compartment. Conversely, reverse movement of the lifting means toward the front of the compartment will cause the X-axis frame to move back into the compartment.

BRIEF DESCRIPTION OF THE DRAWINGS

FIG. 2 is a schematic of the drive means for moving the X-axis frame and lifting means along the X-axis of the cargo compartment;

FIG. 3 is a partial section at 3 of FIG. 2 showing a part of the idler assembly of FIG. 2;

FIG. 4 is a schematic of the drive means for moving the X-axis frame and lifting means along the Y-axis of the cargo compartment;

FIG. 5 is a view taken on the line 5—5 of FIG. 1;

FIG. 6 is a partial plan view showing a Y-axis beam and X-axis frame.

FIG. 7 is an enlarged perspective view of the area designated "7" of FIG. 1;

FIG. 8 is a partial perspective view of the hoist carrier and winch assembly mounted on the X-axis frame track; and FIG. 9 is a partial perspective view of a cable carrier.

BRIEF DESCRIPTION OF THE PREFERRED EMBODIMENT

Figure 1:
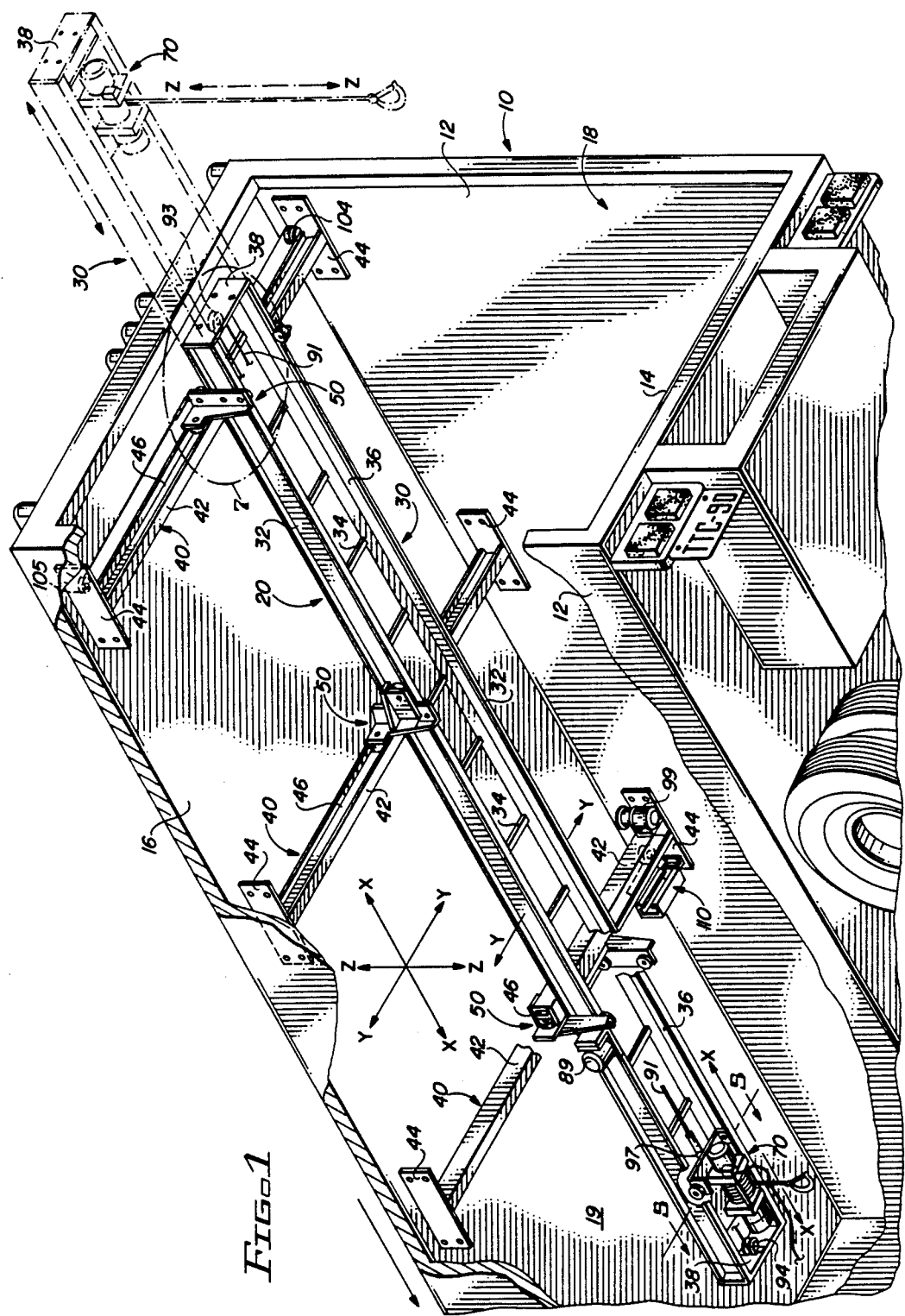
FIG. 1 is a perspective view of the three axis material handling system mounted in the interior of a cargo compartment of a truck and adjacent the roof of the cargo compartment.

FIG. 1 shows in part the cargo compartment 10 of a van, which compartment has opposed side walls 12, bed 14, roof 16, and a rear opening 18 and front wall 19. Mounted adjacent the roof 16 of the cargo compartment 10 is the material handling system of this invention and shown generally at 20. The system includes as principal components: an X-axis frame 30; a series of Y-axis frames 40; a carriage assembly 50; lifting or hoist means 70; X-axis drive means 90 (see FIG. 2 and FIG. 3); and Y-axis drive means 100 (see FIG. 4). In describing the material handling system of this invention, the expression X-axis refers to the axis which traverses the length of cargo compartment 10, that is, from the front wall 19 to the rear opening 18; Y-axis refers to the axis which traverses the width of the cargo compartment, that is, between sidewalls 12; and the Z-axis refers to the vertical axis of the compartment; all as shown by appropriate arrows in FIG. 1.

As shown in FIG. 1, the X-axis frame 30 includes a pair of generally C-shaped beams 32 positioned on the X-axis of compartment 10 and which beams extend substantially the entire length of the compartment. Beams 32 are secured together in a spaced apart relationship by means of a series of braces 34 and end plates 38. As best shown in FIG. 5, mounted on the interior sides of each beam 32 is hoist carrier track 36, each hoist carrier track also extending the length of beams 32. Positioned above the X-axis frame 30 are Y-axis frames 40, and in the specific embodiment shown there are three such frames. Each of the Y-axis frames 40 is positioned immediately adjacent roof 16 of compartment 10 and each includes beam 42, the ends of each beam being attached to plate 44, which plate in turn is securely mounted to the structural members of each side wall 12. As shown, there is a Y-axis beam positioned near the front 19 of the cargo compartment, one positioned at about the center of the compartment, and a third beam positioned near the rear opening 18 of the cargo compartment. Each beam 42 is provided with a channel 46 positioned on the side beam and extending the length of the beam. It is important that the channels of the beams not all face in the same direction. Thus, with respect to the embodiment shown, the channels in the beams near the rear opening and center of the compartment face toward the rear of the cargo compartment, whereas the channel of the beam near the front wall of the compartment faces toward the front of the compartment, or the front of the vehicle.

The X-axis frame assembly 30 is suspended from and movably mounted to the Y-axis frames 40 by means of a carriage assembly shown generally at 50. Since three Y-axis frames are employed, three carriage assemblies are used. The carriage assembly not only permits the X-axis frame to move side to side throughout substantially the entire Y-axis of the compartment, it also allows the X-axis frame to move along the X-axis of the compartment, as well as a predetermined distance out the rear end of the compartment 10. As shown best in FIG. 7, carriage assembly 50 is a generally U-shaped structure having an upper horizontal bar 52 positioned over the X-frame beams and a pair of spaced apart vertically positioned and angled bars 54 which depend downwardly from bar 52 and which are positioned on each side of the X-frame beams. Rotatably mounted at each end of bar 52 are rollers 56 which ride in channel 46 of Y-axis beam 42. Mounted at each end of section 54b of bar 54 are top support rollers 58 and bottom support rollers 64. Top support rollers 58 are mounted on shaft 62 which in turn is mounted to section 54b of each bar 54. Bottom support rollers engage the underside of each X-beam 32. Thus, the carriage assembly 50 not only suspends the X-axis frame from the Y-axis beam, but by virtue of rollers 56 riding in track 46, allows the X-axis frame assembly to move from side to side along the Y-axis of the compartment. Furthermore, the X-axis frame will also move along the X-axis of the compartment by virtue of each X-axis beam being mounted between rollers 58 and 64.

The material handling system also includes lifting or hoist means 70 movably mounted on the X-axis frame 30. As best shown in FIGS. 5 and 8, hoist means 70 includes hoist carrier 72, which in end view is generally U-shaped having side walls 72a. In a top view (see FIG. 2) carrier 72 is rectangular shaped with a roller 74 mounted at each end of each side wall 72a, the carrier thus having four rollers. The hoist carrier rollers ride in X-beam tracks 36. Mounted on the underside of carrier 72 is a winch assembly including motor 76, cable drum 78, transmission 82 and power cable 84. The hoist carrier and its winch assembly are movably mounted between X-axis beams 32 on hoist carrier track 36 as shown in both FIGS. 5 and 8. Thus, the hoist carrier and its attendant winch assembly can easily move along the X-axis of the compartment on the X-axis frame 30. As shown in FIG. 8, power cord 84 to the winch motor is suspended beneath an X-axis beam 32 on rod 86 which in turn is mounted to rod support 88 on beam 32.

Drive means are provided for moving the X-axis frame assembly 30 and its lifting means 70 throughout both the X and Y axes of cargo compartment 10. Such drive means with respect to moving the X-axis frame and its lifting means throughout the X-axis of cargo compartment 10 are schematically illustrated in FIGS. 2 and 3 wherein the drive means 90 include a motor and capstan 89 mounted on vertical member 54a of a carriage assembly 50 (see also FIG. 1). Mounted to an adjacent carriage assembly is idler pulley 92 with additional idler pulleys 93 and 94 mounted at each end of the X-axis frame 30 on end plates 38. Additionally, a pair of movable pulleys 95 and 96 are mounted in tandem by means of bar 98. Each end of wire cable 91 is attached to the hoist carrier 72, one end of the cable to anchor 97 and the other end to anchor 97A. The end of cable 91 attached to anchor 97 passes around idler pulley 94, then around idler pulley 95, then to the capstan of motor 89, to idler pulley 92, to idler pulley 96, then to idler pulley 93 and finally the cable is attached to anchor 97A on carrier 72. Thus, energizing motor 89 will cause the hoist carrier to move back and forth on track 36 throughout the length of the X-axis frame and consequently the X-axis of compartment 10. Reversing motor 89 will cause carrier 72 to move in an opposite direction. Drive means 90 not only moves the hoist carrier and its winch assembly throughout the length of the X-axis frame 30, but also has the ability to move the X-axis frame along the X-axis of the compartment. This is accomplished by providing a rubber bumper at or near each end of the X-axis frame, for example on each end plate 38. Thus when the hoist carrier moving on frame 30 makes contact with the bumper it causes the entire X-axis frame to move in an X-axis direction. Reference is made to FIG. 1 where the X-axis frame 30 is shown extended a distance beyond the rear end of cargo compartment 10. The hoist means 70 has moved on the X-frame by means of the drive means 90 from the front end of compartment 10 to the rear end of compartment 10, where it contacts end plate 38 causing the X-axis frame to move out a distance from the end of the compartment. Although not shown, appropriate stops are incorporated in the system so that the X-axis frame will only extend out the rear of the cargo compartment a pre-determined distance so as to not cause undue stress on the system when it is picking up or delivering heavy material. For example, in an X-axis frame having a length of about 22 feet, stops are provided so that the X-axis frame will extend approximately six feet beyond the rear of the cargo compartment. To bring the extended X-axis frame back into the cargo compartment, motor 89 is reversed, causing the lift means 70 to move on the X-frame toward the front end of the cargo compartment 10. When it makes contact with end plate 38 at the opposite end of the X-frame assembly, it will cause the X-frame to move back into the cargo compartment.

Drive means 100 are also provided to move the X-axis frame and lifting means 70 along the Y-axis frames 40 and thus throughout the Y-axis of compartment 10. Such drive means are schematically illustrated in FIG. 4, and as shown, idler pulleys 104, 105, 106, and 107 are mounted at each corner of compartment 10 and more specifically on an end of Y-axis beams 42 (see FIG. 1 for mounting of pulleys 104 and 105). Positioned intermediate of these corner pulleys are idler pulleys 102 and 103 which also may be conveniently mounted on each end of the center Y-axis beam 42. A motor and capstan 99 are mounted at one end of the Y-axis beam 42 positioned at the front end of compartment 10 (see FIG. 1). A pair of cables 101 and 101A are employed and as shown in FIG. 4 cable 101 is attached to an end of X-axis frame 30 at 108A, passes around idler pulley 107, then to the capstan of motor 99, then diagonally across the X-axis frame to idlers 102 and 105 and is then attached to the opposite side and opposite end of frame 30 at 108C. Cable 101A is attached to end of frame 30 at 108D, passes around idler pulley 106, then diagonally across the frame to idlers 103 and 104 and is then attached to the opposite side and opposite end of frame 30 at 108B. It will thus be seen that energizing motor 99 will cause the movement of cables 101 and 101A in the direction shown by the arrows in FIG. 4 and cause movement of the entire X-axis frame 30 in a direction along the Y-axis of the compartment. Conversely, reversing motor 99 will cause movement of the frame in an opposite direction along the Y-axis of the compartment.

Although not shown, each of the drive systems 90 and 100, as well as the powered winch can be operated by means of a control unit mounted at a convient place either outside of the van or inside the compartment 10. It is preferred that the control of the drive systems and motor powered winch be in a hand held control unit so that operator or van driver has more flexibility in loading and unloading cargo.

FIG. 9 shows a portion of a cable carrier 110 mounted to a side wall 12 of compartment 10 and adjacent the roof 16. Carrier 110 extends substantially the width of the compartment. The purpose of carrier 110 is to handle the power cable supplying motor 89 of the drive system for the X-axis frame 30. Since motor 89 is mounted to carriage assembly 50, the motor will move throughout the Y-axis of the compartment and consequently a relatively long power cable, be it hydraulic or electrical, is required. The carrier will contain the cable or hydraulic hose and prevent it from being damaged by movement of the X-axis frame or from interfering with proper movement of the frame. As shown carrier 110 is a three sided box-like structure having top and bottom walls 112 and 114 and side wall 116. Bottom wall 114 has an up-turned lip 118 and top wall 112 has a down-turned lip 120. Cable 122 is shown entering through opening 124 in mounting bracket 126.

It will be appreciated that the material handling system of this invention provides a highly efficient means for handling, and transporting heavy cargo both within and outside the van.

I claim:

1. A material handling system for moving cargo both within and without the cargo compartment of a vehicle, said cargo compartment having a bed and opposed sidewalls, a front end and rear opening thereto and having an X-axis traversing the length of the compartment, a Y-axis traversing the width of the compartment, and a Z-axis traversing the height of the compartment, said system including: at the least two spaced apart Y-axis frame means extending between the sides of said compartment and positioned at the upper portion of said compartment sidewalls, each of said Y-axis frame means including a channel extending substantially the length of said Y-axis frame means; an X-axis frame positioned beneath said Y-axis frame means and extending substantially the length of the x-axis of said compartment, said X-axis frame being suspended from and mounted to each of said Y-axis frame means by a carriage assembly in a manner such that said X-axis frame will move through both the X-axis and Y-axis of said comparemtn both inside and outside said compartment; said carrige assembly provided with roller means mounted in the channel of said Y-axis frame means to allow said X-axis frame to move along the Y-axis of said compartment, said carriage assembly provided with additional roller means to support said X-axis frame and to allow said X-axis frame to move along said X-axis; hoist means movably mounted on said X-axis frame; a first drive means for movign said X-axis frame and hoist means through the Y-axis of said compartment; second drive means for movign said hoist means along said X-axis frame, said second drive means also providing the means for moving said X-axis frame through the X-axis of said compartment to a predetermined distance outside of and back into said compartment; and means to control the operation of said first and second drive means.

2. The system of claim 1 wherein said Y-axis frame means includes at least two Y-axis beams, one of which is positioned near the front end of said compartment and the other of which is positioned near the rear opening of said compartment with each beam having a channel extending substantially the length of each beam; wherein said X-axis frame includes a pair of spaced apart beams extending substantially the X-axis length of said compartment with a track mounted on the interior side of each beam; and wherein said carriage assembly is a generally U-shaped structure having an upper horizontal support member extending above said X-axis frame and a pair of spaced apart vertically positioned support members mounted near each end of said support member and along the side of each Xframe beam, and wherein roller means are mounted to said upper support member and positioned in said Ybeam channels, and wherein roller means are mounted in said vertically positioned support means and which support said X-axis beams for X-axis movement; and wherein said hoist means are mounted in the tracks of said X-axis beams.

3. The system of claim 2 wherein the channels of said Y-axis beams face in opposite directions; wherein said carriage assembly includes a top support roller in each vertically positioned support means which rides on the top of each X-axis beam and a bottom support roller which supports the bottom of each X-axis beam; and wherein said hoist means includes a hoist carrier moveably mounted in said X-beam tracks and wherein means for lifting cargo are mounted to said carrier.

4. The system of claim 3 wherein said first drive means includes a first cable mounted on one side of a first end of said X-axis frame, and, by means of idler pulleys to the opposite side of the second end of said X-frame, with motor means to move said first cable, and a second cable mounted to the opposite side of said first end of said X-frame and, by means of idler pulleys to a second end of said X-frame on the side of the frame opposite the mounting of said first cable.

5. The system of claim 4 wherein said second drive means includes an idler pulley mounted on each end of said X-frame, a pair of moveable idler pulleys positioned intermediate of said frame mounted pulleys, motor means mounted to a carriage assembly, an idler pulley mounted to a second carriage assembly, and a cable one end of which is secured to said hoist carrier, said cable firstly engaging one of said end pulleys, then one of said intermediate pulleys, then said motor means, then said carriage assembly mounted pulley, then the other of said intermediate pulleys, then the second of said frame mounted pulleys, and lastly secured to said hoist carrier.

6. The system of claim 5 wherein operation of said motor means of said second drive means will cause movement of said hoist carrier along said X-frame until said hoist carrier contacts an end of said Xframe, and wherein continued operation of said motor means will cause said hoist carrier and said X-frame to move along the X-axis of said compartment.

7. The system of claim 6 including a Carrier for containing the cable supplying power to the motor means of said second drive means, said carrier extending substantially the Y-axis of said compartment and mounted adjacent the roof thereof, said carrier being a box-like structure with a portion of one side wall open to the compartment, and with a portion of said cable being positioned within said carrier.

* * * * *